United States Patent
Chenard et al.

(10) Patent No.: US 10,816,721 B1
(45) Date of Patent: Oct. 27, 2020

(54) HOLLOW-CORE FIBER WITH ANTI-RESONANT ARCHES AND METHOD OF MANUFACTURING THEREOF

(71) Applicant: IRflex Corporation, Danville, VA (US)

(72) Inventors: Francois Chenard, Danville, VA (US); Oscas Alvarez, Danville, VA (US)

(73) Assignee: IRFlex Corporation, Danville, VA (US)

( * ) Notice: Subject to any disclaimer, the term of this patent is extended or adjusted under 35 U.S.C. 154(b) by 0 days.

(21) Appl. No.: 16/380,836

(22) Filed: Apr. 10, 2019

(51) Int. Cl.
*G02B 6/02* (2006.01)
*C03B 37/012* (2006.01)
*C03B 37/022* (2006.01)

(52) U.S. Cl.
CPC .... *G02B 6/02328* (2013.01); *C03B 37/01274* (2013.01); *C03B 37/022* (2013.01); *C03B 2203/16* (2013.01); *C03B 2203/22* (2013.01)

(58) Field of Classification Search
CPC .......... G02B 6/02328; C03B 37/01274; C03B 37/022; C03B 2203/16; C03B 2203/22
See application file for complete search history.

(56) References Cited

U.S. PATENT DOCUMENTS

| | | | | |
|---|---|---|---|---|
| 9,791,619 B2* | 10/2017 | Challener | .......... | G02B 6/02309 |
| 9,810,837 B2* | 11/2017 | Benabid | .......... | B29D 11/00663 |
| 10,527,782 B2* | 1/2020 | Lyngsoe | ............. | C03B 37/0122 |
| 2004/0049166 A1 | 3/2004 | Chen et al. | | |
| 2005/0185908 A1 | 8/2005 | Roberts et al. | | |
| 2005/0226579 A1 | 10/2005 | Fink et al. | | |
| 2016/0124144 A1 | 5/2016 | Benabid et al. | | |
| 2017/0160467 A1* | 6/2017 | Poletti | .................... | G02B 6/024 |

OTHER PUBLICATIONS

International Search Report and Written Opinion in PCT Appl. No. PCT/US2019/026844 (12 pages).

\* cited by examiner

*Primary Examiner* — Ellen E Kim
(74) *Attorney, Agent, or Firm* — Woods Rogers PLC; Nathan A. Evans

(57) ABSTRACT

A hollow-core fiber with a single layer of robust anti-resonant optical arches is disclosed, which is designed and made of infrared soft glass and allows the transmission of mid- to long-infrared wavelengths (1-15 microns). Each curved arch is solidly attached at two locations on the outer solid region surface and together the arches define the core diameter. The thickness and spacing between the arches are selected to minimize the fiber transmission loss <1 dB/m at wavelengths in the mid- to long-infrared where the infrared soft glass has high absorption >30 dB/m. A hollow-core preform with anti-resonant arches is made by extrusion of infrared soft glasses through a die specifically designed to produce the hollow-core fiber with anti-resonant arches.

26 Claims, 5 Drawing Sheets

BOTTOM VIEW

TOP VIEW

HOLLOW-CORE FIBER WITH ANTI-RESONANT ARCHES AND METHOD OF MANUFACTURING THEREOF

BACKGROUND OF THE INVENTION

Field of the Invention

Embodiments of the present invention relate generally to the design and precise fabrication of a hollow-core anti-resonant fiber, and more particularly to a hollow-core fiber made from an extruded soft glass preform that utilizes a single layer of robust reflecting optical arches for transmission of mid- to long-infrared light. The guidance mechanism and design of this fiber allow the low-loss transmission of wavelengths of light which falls within the high absorption spectrum of the confining material.

Description of Related Art

The hollow-core photonic band gap (HC-PBG) fiber is a special photonic crystal fiber design, which guides light in the air-core surrounded by a periodic 2-dimensional array of small holes in the cladding (see, for example, J. C. Knight, J. Broeng, T. A. Birks, and P. S. J. Russell, "Photonic band gap guidance in optical fibers," Science 282(5393), 1476-1478 (1998)). In the HC-PBG fiber the light is substantially confined to the hollow core by virtue of the periodic photonic band gap structure of the cladding. However, the guided light in the core strongly overlaps with the glass contour microstructure, which limits the HC-PBG transmission range to the transparency of the glass material used because of the light absorption in the glass struts.

Hollow-core anti-resonant (HC-AR) fiber is an alternative approach to HC-PBG fiber to minimize the light overlap in the glass struts. The hollow core is surrounded by thin glass struts of equal thickness t and refractive index n designed such that multiple wide transmission wavelength bands are centered between the high-loss resonant wavelengths of the fiber at:

$$\lambda_m \approx \frac{2t\sqrt{n^2-1}}{m}, m = 1, 2, 3, \ldots$$

The anti-resonance in the thin glass struts at the interface of the hollow core and the cladding (core surround) efficiently reflects and confines the light in the hollow core. The HC-AR fiber can transmit longer wavelengths than otherwise possible in the glass itself because the light does not penetrate in the material.

HC-AR fiber with circular core surround, like the Kagome fiber (see, for example, F. Couny, F. Benabid, and P. S. Light, "Large-pitch kagome-structured hollow-core photonic crystal fiber," Opt. Lett. 31(24), 3574-3576 (2006)), confines more of the light in the air core but has a relatively high transmission loss (>1 dB/m) caused by the scattering of undesired and thicker nodes at the intersection between struts. The improved Kagome fiber with negative curvature core surround pushes the nodes away from the air core and significantly reduces the transmission loss <0.1 dB/m (see, for example, Y. Y. Wang, N. V. Wheeler, F. Couny, P. J. Roberts, and F. Benabid, "Low loss broadband transmission in hypocycloid-core Kagome hollow-core photonic crystal fiber," Opt. Lett. 36(5), 669-671 (2011)). Studies have demonstrated that most of the light confinement in the Kagome lattice fibers occurs due to anti-resonance in the core surrounding ring with little contribution due to the second ring: the remaining part of the periodic layers of holes is not effective at creating coherent reflections and has almost no light-guiding role.

This has resulted in the development of simplified HC-AR fibers with just one ring of capillary tubes surrounding its core. Recent improvements include the more efficient HC-AR fiber with a single row of non-touching tubes (see, for example, A. N. Kolyadin, A. F. Kosolapov, A. D. Pryamikov, A. S. Biriukov, V. G. Plotnichenko, and E. M. Dianov, "Light transmission in negative curvature hollow core fiber in extremely high material loss region," Opt. Express 21(8), 9514-9519 (2013)). The non-touching tube lattice structure eliminates the undesired scattering loss at the touching nodes and can achieve a low fiber transmission loss of <1 dB/m, even at long wavelengths up to 4 microns where the silica glass material absorption is very high, such as >880 dB/m. Additionally, simulations have shown that the higher order modes of the HC-AR fiber are more attenuated than the fundamental mode, so the fiber is purely single mode after only a few meters. However, silica cannot be used for HC-AR fiber at wavelengths >4.3 microns because the small portion of the guided light that interacts with the silica core-surround is highly absorbed and does not propagate far. Further, the manufacture of such single-ring non-touching tube fiber with the conventional stack-and-draw technique is very challenging. The precise stacking of the non-touching tubes in the preform is difficult to achieve and maintain up to the fiber draw. Variations in tube thickness and spacing will inevitably change the fiber transmission performances.

The use of infrared glasses for the fabrication of simplified HC-AR fiber is attractive for extending the transmission to longer wavelengths such as >4.3 microns. However, infrared glasses are soft with low melting temperature, and the manufacturing process of HC-AR fiber with soft glass is even more challenging. The stack-and-draw technique was unsuccessful in the fabrication of HC-AR fiber with a single row of touching chalcogenide glass tubes (see, for example, V. S. Shiryaev, "Chalcogenide glass hollow-core microstructured optical fibers," Frontier in Materials 2(24), 1-10 (2015)). Furthermore, it would be extremely unlikely to successfully use the stack-and-draw technique with infrared soft glasses to manufacture the HC-AR fiber with non-touching tubes while controlling precisely the thickness, shape, and spacing between tubes.

Extrusion is an alternative to the stack-and-draw technique for making HC-AR fiber with soft glass. The first extruded HC-AR fiber had a hexagonal core with a single ring of 6 cladding holes (see G. Tsiminis, K. J. Rowland, E. P. Schartner, N. A. Spooner, T. M. Monro, and H. Ebendorff-Heidepriem, "Single-ring hollow core optical fibers made by glass billet extrusion for Raman sensing," Opt. Express 24(6), 5911-5917, (2016)). This first demonstration was made with lead-silicate glass (F2, Schott) and produced HC-AR fiber with very a high transmission loss of >20 dB/m in the visible wavelengths.

Infrared soft glass, chalcogenide, has recently been extruded to produce HC-AR "tube-like" fibers (see R. R. Gattass, D. Rhonehouse, D. Gibson, C. C. McClain, R. Thapa, V. Nguyen, S. S. Bayya, R. J. Weiblen, C. R. Menyuk, L. B. Shaw, J. S. Sanghera, "Infrared glass-based negative-curvature anti-resonant fibers fabricated through extrusion," Opt. Express 24(22), 25697-25703, (2016)). The die was fabricated to extrude a preform with a single row of eight non-touching tubes. The extruded preform had relatively thick inner tube wall thickness, approximately 350 microns, and had to be pressurized to draw the HC-AR fiber with 7 microns inner tube wall thickness. The produced HC-AR fiber showed some transmission in the long-infrared window around 10 microns, but it had significant fabrication imperfections (variations in inner tubes diameter (±8%), thickness (±7%), and spacing (±34%)) that resulted in "blurring" of the transmission band and fairly high transmission loss >2.1 dB/m. The non-touching tubes are susceptible to lateral movement during fiber fabrication, especially when pressurization is used. The fabrication of HC-AR fiber with non-touching tubes appears to be difficult to use with soft glass while controlling precisely the thickness, shape, and spacing between tubes.

The above-mentioned fiber designs offer some viable solutions and some drawbacks for the fabrication of HC-AR fibers. However, none of them can efficiently use infrared soft glasses to produce the desired HC-AR fiber for mid- to long-infrared light with the tight geometry tolerances (<5%) required to achieve a low transmission loss of <1 dB/m. Low melting temperature infrared soft glasses enable the opportunity to use extrusion techniques to precisely produce preforms with unique shapes and features. Consequently, there is a need for new HC-AR fiber designs and fabrication techniques that would enable the tight geometry tolerances and the low transmission loss in the mid- to long-infrared.

SUMMARY OF THE INVENTION

Embodiments of the present invention concern the use of infrared soft glass to produce an improved hollow-core fiber, using a single layer of anti-resonant optical arches to offer low-loss transmission of <1 dB/m in the mid- to long-infrared range (1-15 microns). The curved arches have a thickness corresponding to the anti-resonance wavelength and are precisely spaced between one another to minimize the fiber transmission loss and to have the fiber effectively in single mode operation. Each arch is solidly attached at two locations on the outer solid region to prevent any lateral displacement and to preserve the arches' shape and uniformity during the fabrication process.

Embodiments also use extrusion to provide the preform with the hollow-core and anti-resonant arches. Three-dimensional (3D) printing (additive manufacturing) with metals is used to produce the extrusion die with an added high-precision machining at the die exit surface to produce high dimension tolerances and reduce the roughness of the inside walls of the die, thereby extruding the hollow-core preform with a smooth surface and very tight dimension tolerances (<5%).

Embodiments also pull the preform into the hollow-core fiber with anti-resonant arches to transmit light that is highly attenuated in the glass material (absorption of about >30 dB/m), and to have a fiber guidance loss of about <1 dB/m in the mid- to long-infrared (1-15 microns).

The present invention will now further be described with reference to the appended drawings, which illustrate various non-limitative embodiments of the present invention.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Generally, a hollow-core fiber is designed and made from an extruded soft glass preform that utilizes a single layer of robust reflecting optical arches for transmission of mid- to long-infrared light.

Figure 1:
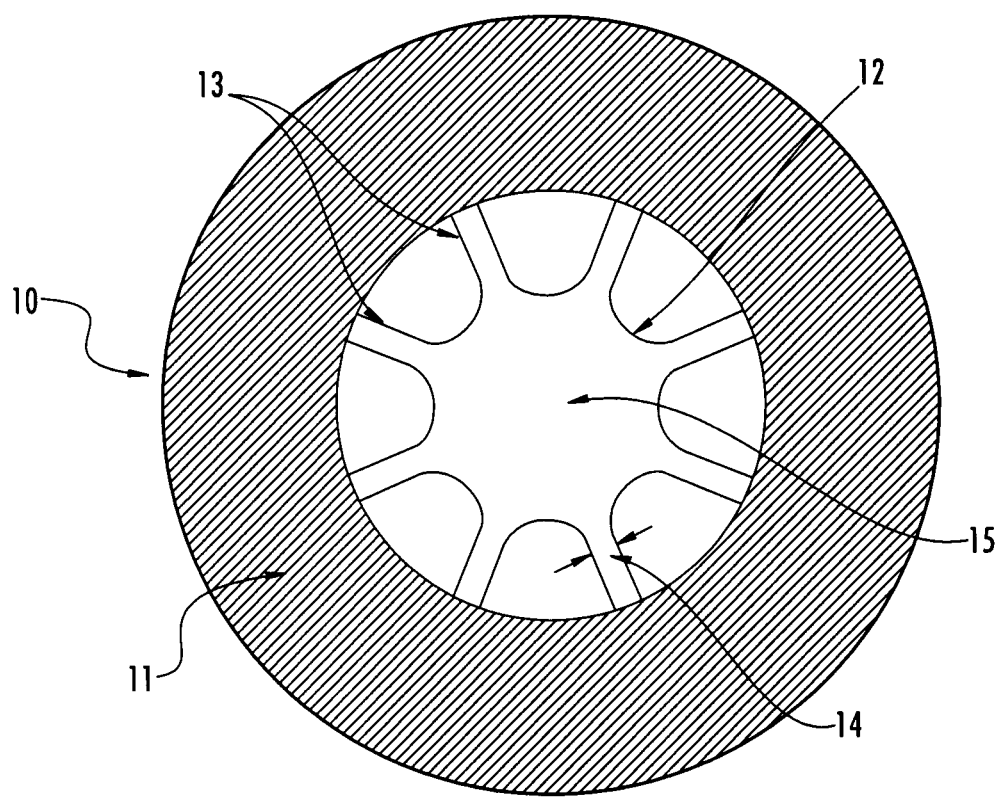
FIG. 1 is a schematic diagram that illustrates a hollow-core fiber with anti-resonant arches in accordance with an embodiment of the present invention.

More precisely, FIG. 1 illustrates a schematic view of an embodiment of a hollow-core fiber 10 made of a single glass material. The hollow-core fiber 10 includes an outer solid region 11 and several curved arches 12 that are each solidly attached at two locations on the outer solid region 11. The outer solid region 11 mechanically secures the arches 12 and provides sufficient mechanical strength to handle the fiber. FIG. 1 illustrates the hollow-core fiber 10 with 8 curved arches 12. However, other embodiments can include a greater or smaller number of arches 12. The curved arches 12 can have a circular, elliptical, or oval shapes. Also, each curved arch 12 is attached to the outer solid region 11 by two legs 13 that can be straight or curved. The legs 13 hold the arches 12 firmly in place to prevent any lateral displacement, and also help to preserve the arches' 12 shape and uniformity during the fabrication process. The arches 12 have a refractive index and uniform wall thickness chosen to fall within the optical anti-resonance of the thin glass arches 12 and efficiently reflect and confine the light within the hollow core 15. The ring of arches 12 forms the cladding region and defines the hollow core 15 diameter. Typically, the wall of the anti-resonant arches 12 is between 1 and 5 microns thick in order to achieve a mid- to long-infrared transmission (e.g. 1-15 microns). The thinnest walls provide a broader spectrum due to their having a more robust anti-resonant condition. The hollow core 15 diameter must be large enough, e.g. ~10× the operation wavelength, to have low transmission loss. The use of spacing 14 between the arches 12 is important to prevent excessive transmission loss that would occur otherwise in the nodes between touching arches. Also, the exact spacing 14 between the arches 12 is chosen to optimize the hollow-core fiber transmission. Smaller spacing 14 will improve light confinement in the hollow-core but can increase bending losses, while larger spacing 14 will promote better single mode operation at the expense of less confinement and increased loss. Modeling and simulations with fiber-optic design software can be used to find an optimum range. The refractive index and attenuation of the soft glass material can be included in the modeling. A smaller gap can actually increase losses even though the confinement is improved; also, the losses are closely tied to the core size as well as the wavelength of choice. The precise dimension tolerances, around <5%, of the hollow-core fiber with anti-resonant arches is important to achieve low-loss transmission within the desired wavelength band.

Figure 2A:
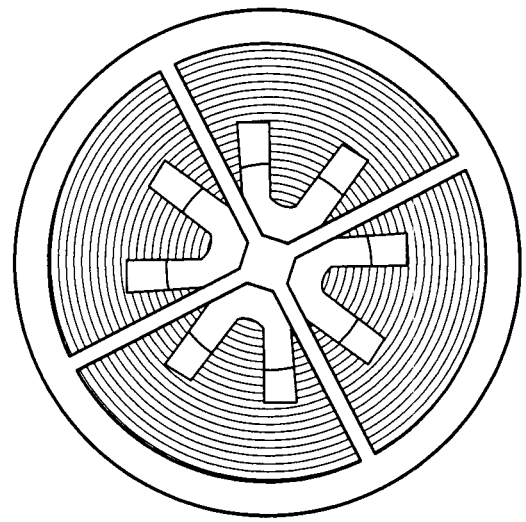
FIGS. 2A and 2B are photographs that show the bottom view and top view of the 3D printed die according to embodiments.
Figure 2B:
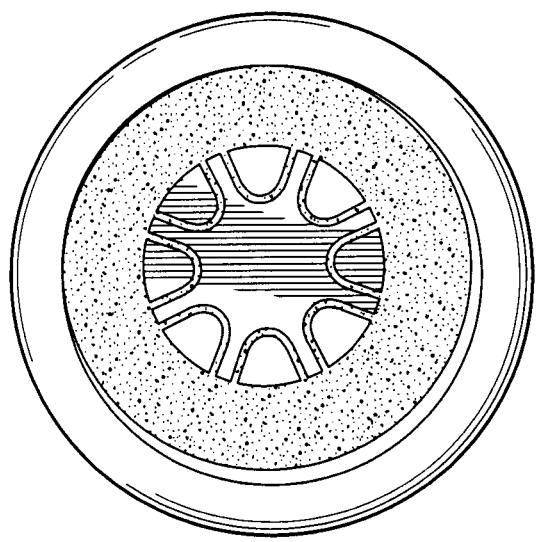

Soft glass has a low melting temperature, <800° C., and can be extruded into rods or tubes of various shapes. Soft glasses for preferred embodiments include infrared glasses such as chalcogenide, fluoride, and tellurite, for example. Typically, the soft glass is inserted in a sleeve inside an oven and pushed with a piston through a die designed for the extrusion process. The extrusion die can be made of metals like stainless steel, titanium alloy, aluminum alloy, or Inconel, for example. FIGS. 2A and 2B illustrate a die to extrude the hollow-core preform with anti-resonant arches. FIG. 2A illustrates the bottom view of the die where the soft molten glass is pushed in. FIG. 2B illustrates the top view of the die from where the extruded glass comes out as a hollow-core glass preform with the desired anti-resonant arches. The sleeve temperature is adjusted to melt the soft glass to the desired viscosity. Lower sleeve temperatures result in a higher viscosity and a higher load on the piston pushing on the soft glass, while higher temperatures produce a lower viscosity and a lower load. The normal range of load for soft glass extrusion is between about 30 kg and 500 kg, with a preferred embodiment having a range in between 30 kg and 150 kg to preserve the desired shapes. The soft glass is extruded through the die and flows in between the 8 arms 20 and 8 spokes 21 to form the anti-resonant arches 12. Three-dimensional (3D) printing, also known as additive manufacturing, is used to produce the die in FIGS. 2A and 2B in a single piece with the desired complex shape and in a cost-effective manner that cannot be otherwise achieved by traditional milling/erosion techniques.

The extruded hollow-core preform with anti-resonant arches is pulled in a fiber using traditional fiber draw techniques. The hollow-core preform is attached to a preform feed and connected to pressurization system where the hollow core and the anti-resonant arches can be independently pressurized. The preform is lowered in the oven at constant feed speed. The heated preform tip forms a bead that drops down the fiber draw tower carrying the fiber. The fiber is pulled and spooled at a draw speed of typically between 2 to 20 m/min. Typical pressures inside the hollow-core preform with anti-resonant arches are controlled within a range between 0 to 50 mbar to precisely adjust the fiber geometries with the desired hollow core diameter and arch dimensions; basically, a higher inner pressure increases the arches' size and reduces the arches' wall thickness.

Example 1

The hollow-core preform with anti-resonant arches was extruded with the extrusion die showed in FIGS. 2A and 2B. The extruded preform was made of infrared chalcogenide glass, more specifically $As_2S_3$ composition. The $As_2S_3$ glass is transparent in the infrared up to 6.5 microns. The $As_2S_3$ glass billet was 25.1 mm in diameter, 70 mm long, and was inserted in the stainless steel sleeve for extrusion.

Figure 3:
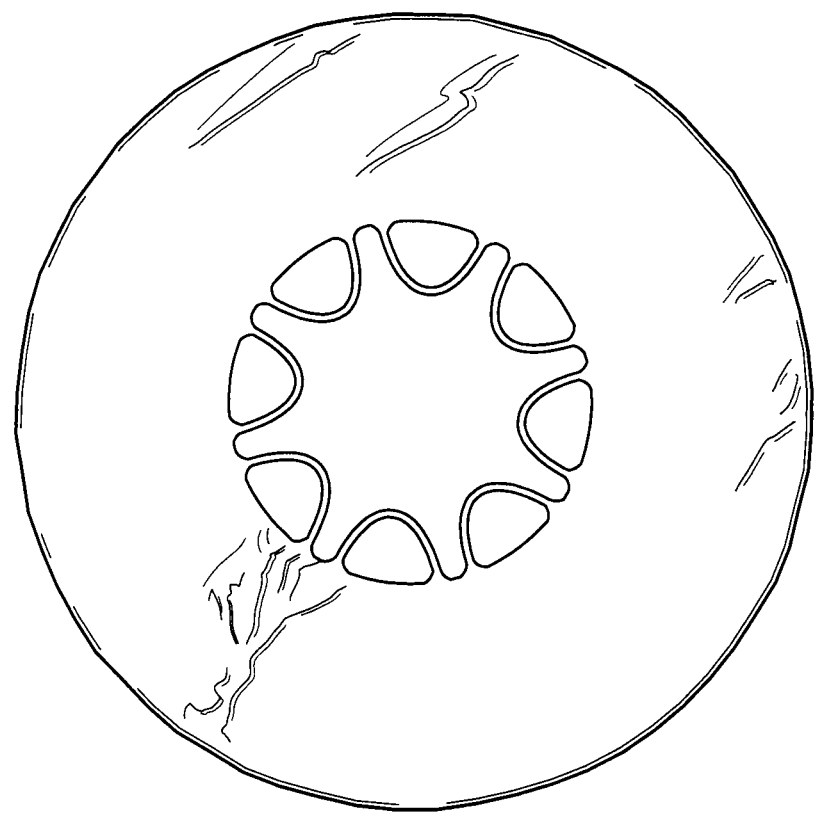
FIG. 3 is a photograph that shows the extruded hollow-core preform with anti-resonant arches extruded with the die of FIGS. 2A and 2B according to embodiments.

Referring to FIG. 3, a preform was extruded at a draw speed of 0.48 mm/min. The sleeve temperature was 380° C. and the piston speed was fixed at 0.15 mm/min, which resulted in a load of 35-40 kg on the piston. The extruded preform diameter was 16 mm and the length was about 150 mm. As shown in FIG. 3, the arches preserved the shape of the die shown in FIGS. 2A and 2B. The height of the arches was 1.3 mm and the wall thickness was 0.18 mm, which was thinner than the gap of 0.449 mm in the die. The hollow core diameter was approximately 4.8 mm. The hollow-core preform dimensions were uniform <5% over the entire length. The surface of the extruded preform is mirror-like on the outside as well as on the inside. The preform can be pulled in the desired hollow-core fiber with anti-resonant arches with standard photonic crystal fiber draw techniques.

Example 2

Figure 4:
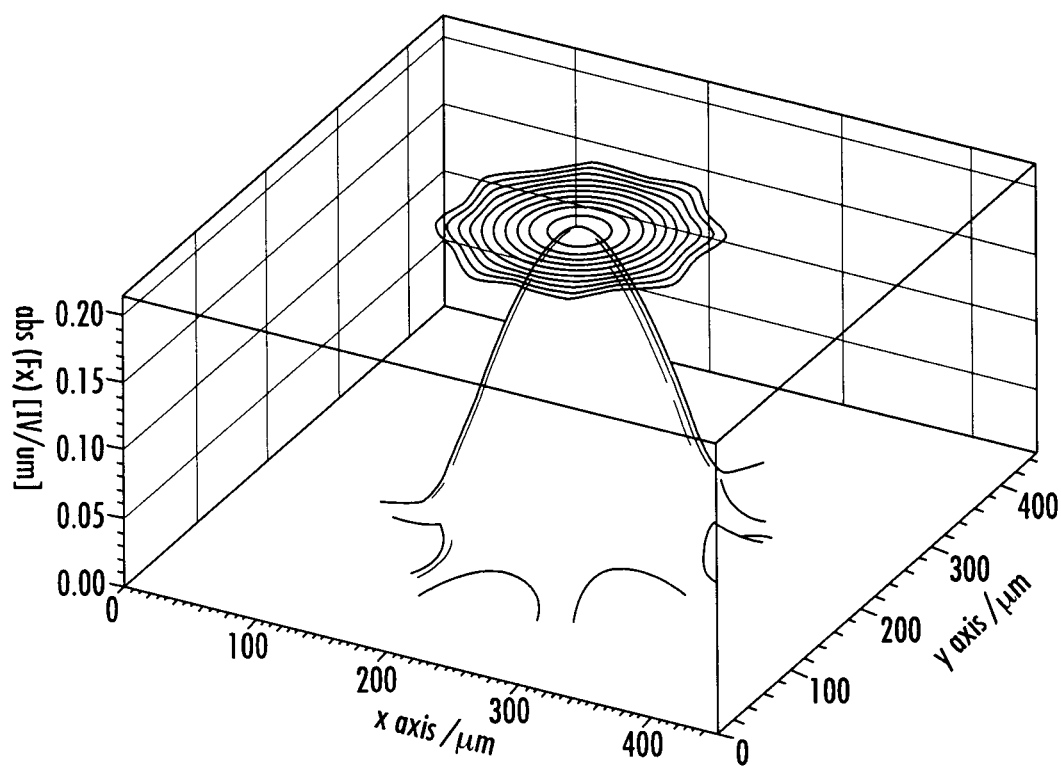
FIG. 4 is a contour plot of the intensity of the fundamental air-guided mode in accordance with a hollow-core fiber of FIG. 1 according to an embodiment.
Figure 5:
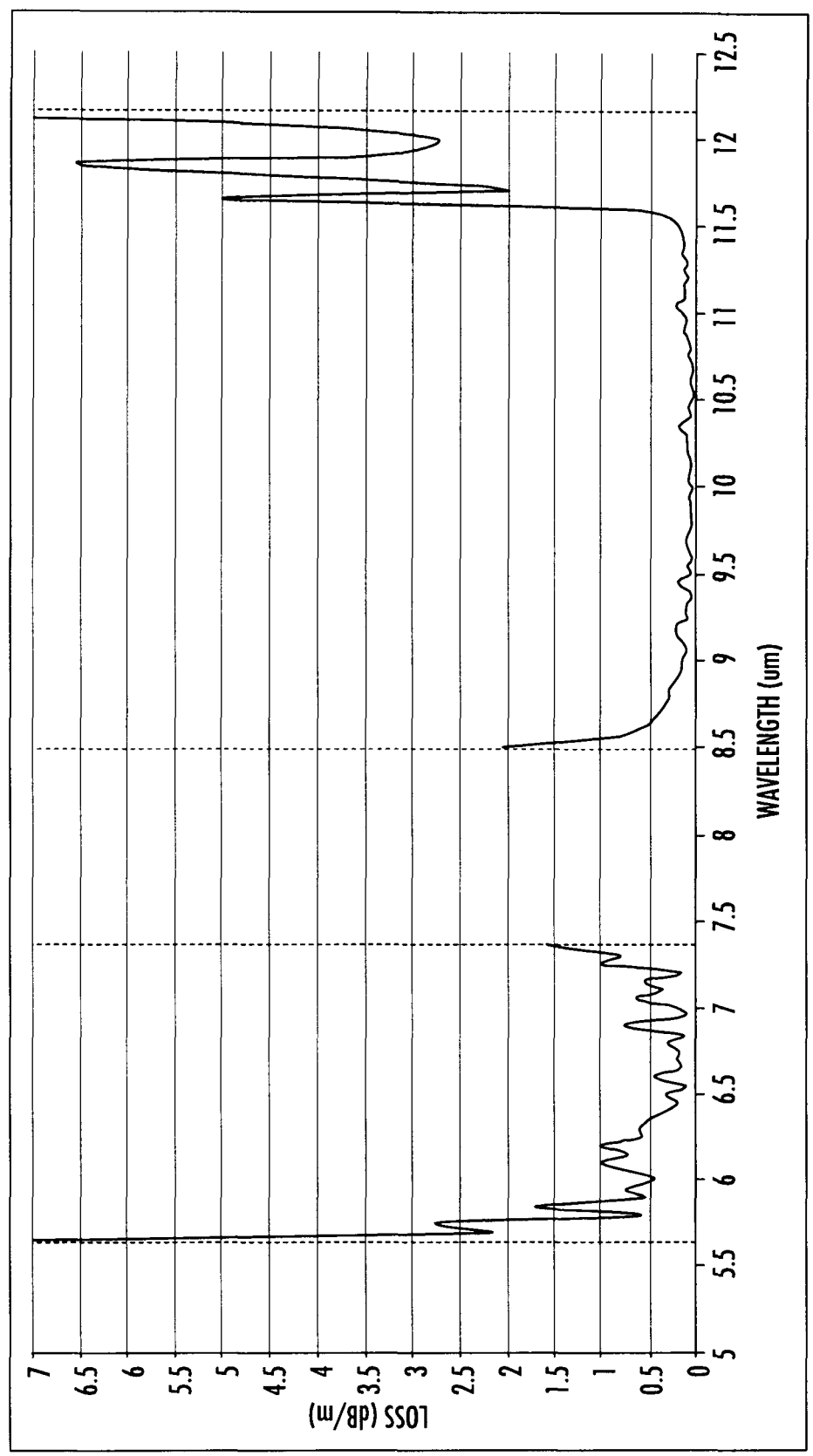
FIG. 5 is a graph showing the calculated transmission loss of the fundamental mode of the hollow-core fiber.

Example 2 relates to a design of the hollow-core fiber with 8 anti-resonant arches for the transmission of $CO_2$ laser light at 10.6 microns. The fiber parameters used for the simulations are: $As_2S_3$ glass, a hollow core diameter of 0.185 mm, an anti-resonant arch wall thickness of 3.7 microns, and a gap between the arches of 21.5 microns. FIG. 4 illustrates the calculated intensity profile of the fundamental mode at 10.6 microns. The intensity is clearly reflected by the anti-resonant arches and barely penetrates within the gaps. FIG. 5 illustrates the calculated spectral loss of the fundamental mode of the hollow-core fiber with anti-resonant arches. Two transmission windows are illustrated, one centered around 10 microns wavelength ($1^{st}$ order resonance) and the other centered around 6.5 microns ($2^{nd}$ order resonance). The calculated transmission loss of the fundamental mode at 10.6 microns was 0.138 dB/m. The calculated transmission loss of the hollow-core fiber with anti-resonant arches is significantly low when one considers that $As_2S_3$ glass highly absorbs light at 10.6 micron (118 dB/m). Also, the hollow-core fiber with anti-resonant arches is relatively resistant to bending loss. The calculated bending loss for the fundamental mode was <0.2 dB/m for a bend radius of around 150 mm.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A hollow-core fiber comprising:
   a tube having an outer boundary and an inner boundary with a solid region therebetween; and
   a plurality of substantially identical arched structures in direct contact with the inner boundary;
   wherein together the inner boundary and the plurality of arched structures define a passageway within the tube, which passageway is capable of transmission of mid- to long-infrared light; and
   wherein each of the substantially identical arched structures is directly attached at two locations to the inner boundary of the tube.

2. The hollow-core fiber of claim 1, wherein each of the substantially identical arched structures is separated from an adjacent arched structure by a gap on the inner boundary of the tube such that a portion of the inner boundary is disposed between each adjacent substantially identical arched structure.

3. The hollow-core fiber of claim 1, wherein each of the substantially identical arched structures has a refractive index n and a thickness t, wherein the refractive index n and the thickness t are designed such that multiple wide transmission wavelength bands (labeled m) are centered between the high-loss resonant wavelengths $\lambda_m$ of the fiber at:

$$\lambda_m \approx \frac{2t\sqrt{n^2 - 1}}{m}, m = 1, 2, 3, \ldots,$$

and wherein the substantially identical arched structures reflect and confine light within the passageway.

4. The hollow-core fiber of claim 1, wherein each of the substantially identical arched structures comprises a pair of legs directly attached to the inner boundary of the tube.

5. The hollow-core fiber of claim 4, wherein each of the substantially identical arched structures comprises a curvilinear region which is disposed between the pair of legs.

6. The hollow-core fiber of claim 4, wherein each leg of the pair of legs is curved.

7. The hollow-core fiber of claim 5, wherein the curvilinear region bridges the pair of legs and projects into the passageway of the tube.

8. The hollow-core fiber of claim 5, wherein the curvilinear region has a shape which is circular, elliptical, or oval.

9. The hollow-core fiber of claim 1, wherein the tube and the plurality of substantially identical arched structures comprise one or more transparent materials in the mid- to long-infrared wavelengths of about 2-15 microns.

10. The hollow-core fiber of claim 9, wherein the one or more transparent materials comprise one or more soft glasses comprising chalcogenide, fluoride, and/or tellurite.

11. The hollow-core fiber of claim 1, wherein the passageway is capable of transmission of mid- to long-infrared wavelengths of about 2-15 microns with a fiber guidance loss of about <1 dB/m.

12. The hollow-core fiber of claim 1, wherein the tube and the plurality of substantially identical arched structures comprise one or more materials with absorption in the mid- to long-infrared wavelengths of about 2-15 microns exceeding 30 dB/m.

13. The hollow-core fiber of claim 12, wherein the passageway is capable of transmission of mid- to long-infrared wavelengths of about 2-15 microns with a fiber guidance loss of about <1 dB/m.

14. The hollow-core fiber of claim 1, further comprising an optical device comprising at least one of:
   a laser beam delivery system,
   an ultra-short pulse laser beam delivery system, and
   a mid-infrared transmission system.

15. A hollow-core fiber comprising:
   a tube having an outer boundary and an inner boundary with a solid region therebetween; and
   a plurality of substantially identical arched structures in direct contact with the inner boundary;
   wherein together the inner boundary and the plurality of arched structures define a passageway within the tube, which passageway is capable of transmission of mid- to long-infrared light;
   wherein each of the substantially identical arched structures comprises a pair of legs directly attached to the inner boundary of the tube; and
   wherein each leg of the pair of legs is straight.

16. The hollow-core fiber of claim 15, wherein each of the substantially identical arched structures is separated from an adjacent arched structure by a gap on the inner boundary of the tube such that a portion of the inner boundary is disposed between each adjacent substantially identical arched structure.

17. The hollow-core fiber of claim 15, wherein each of the substantially identical arched structures has a refractive index n and a thickness t, wherein the refractive index n and the thickness t are designed such that multiple wide transmission wavelength bands (labeled m) are centered between the high-loss resonant wavelengths $\lambda_m$ of the fiber at:

$$\lambda_m \approx \frac{2t\sqrt{n^2 - 1}}{m}, m = 1, 2, 3, \ldots,$$

and wherein the substantially identical arched structures reflect and confine light within the passageway.

18. The hollow-core fiber of claim 15, wherein each of the substantially identical arched structures comprises a curvilinear region which is disposed between the pair of legs.

19. The hollow-core fiber of claim 18, wherein the curvilinear region bridges the pair of legs and projects into the passageway of the tube.

20. The hollow-core fiber of claim 18, wherein the curvilinear region has a shape which is circular, elliptical, or oval.

21. The hollow-core fiber of claim 15, wherein the tube and the plurality of substantially identical arched structures comprise one or more transparent materials in the mid- to long-infrared wavelengths of about 2-15 microns.

22. The hollow-core fiber of claim 21, wherein the one or more transparent materials comprise one or more soft glasses comprising chalcogenide, fluoride, and/or tellurite.

23. The hollow-core fiber of claim 15, wherein the passageway is capable of transmission of mid- to long-infrared wavelengths of about 2-15 microns with a fiber guidance loss of about <1 dB/m.

24. The hollow-core fiber of claim 15, wherein the tube and the plurality of substantially identical arched structures comprise one or more materials with absorption in the mid- to long-infrared wavelengths of about 2-15 microns exceeding 30 dB/m.

25. The hollow-core fiber of claim 24, wherein the passageway is capable of transmission of mid- to long-infrared wavelengths of about 2-15 microns with a fiber guidance loss of about <1 dB/m.

26. The hollow-core fiber of claim 15, further comprising an optical device comprising at least one of:
   a laser beam delivery system,
   an ultra-short pulse laser beam delivery system, and
   a mid-infrared transmission system.

\* \* \* \* \*

UNITED STATES PATENT AND TRADEMARK OFFICE
CERTIFICATE OF CORRECTION

Page 1 of 1

PATENT NO. : 10,816,721 B1
APPLICATION NO. : 16/380836
DATED : October 27, 2020
INVENTOR(S) : Francois Chenard and Oscas Alvarez It is certified that error appears in the above-identified patent and that said Letters Patent is hereby corrected as shown below:

On the Title Page

Item (72) please replace inventor name "Oscas Alvarez" with "Oseas Alvarez."

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*